(12) United States Patent
Stinson et al.

(10) Patent No.: US 8,086,466 B2
(45) Date of Patent: *Dec. 27, 2011

(54) METHOD AND APPARATUS FOR GENERATING CUSTOMIZED FURNITURE DOCUMENTATION

(75) Inventors: Keith Stinson, Birmingham, MI (US);
David W. Bickford, Saline, MI (US);
Timothy J. Mallos, Brighton, MI (US)

(73) Assignee: C.F. Stinson, Inc., Rochester Hills, MI (US)

( * ) Notice: Subject to any disclaimer, the term of this patent is extended or adjusted under 35 U.S.C. 154(b) by 947 days.

This patent is subject to a terminal disclaimer.

(21) Appl. No.: 11/801,477

(22) Filed: May 10, 2007

(65) Prior Publication Data

US 2008/0313055 A1   Dec. 18, 2008

Related U.S. Application Data

(63) Continuation of application No. 10/473,995, filed as application No. PCT/US02/18993 on Jun. 17, 2002, now Pat. No. 7,249,035.

(60) Provisional application No. 60/298,454, filed on Jun. 15, 2001.

(51) Int. Cl.
*G06Q 10/00* (2006.01)
*G06Q 30/00* (2006.01)

(52) U.S. Cl. .................. 705/1.1; 705/26.1; 705/27.2

(58) Field of Classification Search ............... 705/1, 26, 705/14, 1.1, 26.1, 27.2
See application file for complete search history.

(56) References Cited

OTHER PUBLICATIONS

Information on Eddie Baouer, Inc., 1998-2001, printed through www.archive.org. Date is in the URL in YYYYMMDD format.*
http://web.archive.org/web/20010220181704/www.scene7.com/technologies/Visual_Wrapp . . .
http://web.archive.org/web/20010220181633/www.scene7.com/technologies/Visual_Wrapp . . .
http://web.archive.org/web/20010220173705/www.scene7.com/about/index.asp.
http://web.archive.org/web/20010220171738/http://www.scene7.com/.
Pawson, D., RenderX: XSL FO and XEP: A Gentle Introduction, printed from http://www.renderx.com/intro.html, May 6, 2011.
RenderX, XEP Diagram, printed from http://www.renderx.com/tools/xep_diagram.html, Jun. 17, 2011.
RenderX, XEP Datasheet, printed from www.renderx.com, Jun. 17, 2011.

* cited by examiner

*Primary Examiner* — Naresh Vig
(74) *Attorney, Agent, or Firm* — Brooks Kushman P.C.

(57) ABSTRACT

Preferred embodiments include a method and apparatus for generating customized product documentation for a furniture item having a plurality of surface material options. A computer receives a plurality of images of surface materials which may be applied to a furniture item and stores the images into a computer database. Label information describing each of the plurality of images and the furniture item is also received into the database. Surface material images are electronically displayed and an image is selected for application to the furniture item. The computer maps the selected surface material onto an image depicting the furniture item. An electronic document is generated which includes an image of the furniture item having the selected surface material mapped thereon and the label information associated with the selected surface material and the furniture item.

20 Claims, 3 Drawing Sheets

METHOD AND APPARATUS FOR GENERATING CUSTOMIZED FURNITURE DOCUMENTATION

CROSS-REFERENCE TO RELATED APPLICATIONS

This application is a continuation of U.S. application Ser. No. 10/473,995 filed Oct. 3, 2003 now U.S. Pat. No. 7,249,035, which claims the benefit of PCT application Serial No. PCT/US02/18993 filed Jun. 17, 2002, which claims the benefit of U.S. provisional application Ser. No. 60/298,454 filed Jun. 15, 2001.

BACKGROUND OF THE INVENTION

Furniture may be manufactured in a multitude of different configurations, each having a respective set of surface material options including fabrics, vinyls, textures, colors, finishes etc. This manufacturing complexity creates a challenge to furniture marketers because the preparation of a catalog displaying all possible configurations may be cost prohibitive. For larger furniture/textile manufactures, creating a catalog which comprehensively discloses all available furniture/surface material combinations would result in a binder that (i) cannot be readily released to the typical customer due to its physical size and cost, (ii) would largely comprise configurations a customer is simply not interested in, (iii) cannot be readily copied, and (iv) is difficult to update when changes in configurations and associated information occur. Furthermore, images, specifications, descriptions, prices and other label information may originate from different sources (e.g. furniture manufacturers, textile manufacturers, furniture/textile assemblers, distributors, retailers, photographers, etc.) which further complicates the compilation of product catalogs.

Online catalogs reduce some of these challenges. For example, a customer can browse an online furniture inventory, and print or download available materials. However, such sites typically do not provide images for all available furniture-surface material configurations. This is because it is prohibitively costly, especially for larger manufacturers, to manufacture all possible configurations, and photograph them for uploading and presentation at an online catalog. Also, new surface materials and furniture configurations are often added, complicating the manufacture-assembly-photography process for all possible configurations. These hurdles typically result in only the more popular configurations being provided. Customers that are not interested in this subset of available configurations are left to imagine the particular furniture-surface material configuration he or she is interested in.

What is needed is a method and apparatus that simplifies and enhances the provision of an online furniture catalog enabling customers to flexibly configure furniture-surface material combinations, and generate product documentation for those customer-defined configurations.

SUMMARY OF THE INVENTION

Embodiments of the present invention include a method and apparatus for generating customized product documentation for a furniture item having a plurality of surface material options. A computer receives a plurality of images of surface materials which may be applied to a furniture and stores the images into a computer database. Surface material images may be presented in a variety of light color temperatures or environmental conditions. Label information describing each of the plurality of images is also received into the database.

Surface material images are electronically displayed and an image is selected for application to the item of furniture. The computer maps the selected surface material onto an image depicting the furniture item. A plurality of mapping methods may be implemented, including but not limited to color mapping, bump mapping and texture mapping.

An electronic document is generated which includes an image of the selected furniture item having the selected surface material mapped thereon and the label information associated with the selected surface material. The document may be generated in a portable document format (PDF).

The above objects and other objects, features, and advantages of the present invention are readily apparent from the following detailed description of the best mode for carrying out the invention when taken in connection with the accompanying drawings and claims.

DETAILED DESCRIPTION OF THE PREFERRED EMBODIMENTS

The following detailed description and associated drawings of the present invention concern preferred embodiments or implementations of the invention. Accordingly, the following description and associated drawings do not describe every conceivable and possible embodiment or implementation of the invention. Those of ordinary skill in the art will recognize that aspects of the present invention may be changed or otherwise adapted to best-fit a particular implementation of the present invention.

Applications of the present invention include, but are not limited to, the custom-labeling of any content or media that can be played, displayed or otherwise output by a computer device. Such content includes computer-generated graphics, pictorial representations of physical objects, samples, text, audio, video, etc. Types of computer output include graphical visual display, audio file output via speaker, download (e.g., to personal computer device, disk, etc.), upload (e.g., to network server, mainframe, peer computer, etc.), and others.

Content in the form of surface material samples includes a representation of any material that can be applied to an object to change its physical appearance (e.g., fabrics, finishes, carpets, laminates, paints, stains, textures, etc.). Typically, surface materials are applied to furniture, countertops, tables, walls, floors, ceilings and the like to enhance their appearance. Notably, the range of surface materials may also include non-textile products such as cosmetics and industrial materials.

Label information to be applied to content or media includes, but is not limited to, a brand or logo, pricing information, descriptive information, specification information, performance information, warranty information, contact information, etc.

For illustrative purposes only, preferred embodiments or implementations of the present invention may be described in the context of the fabric and finish industry. Surface materials utilized within this industry may include upholsteries, seating fabrics, panel fabrics, vinyls, paints, laminates, stains, etc. These surface materials may be brought to market by various textile manufacturers, furniture manufacturers, re-manufacturers, distributors and retailers who may supply or compete against one another with common fabrics and finishes.

Figure 1:
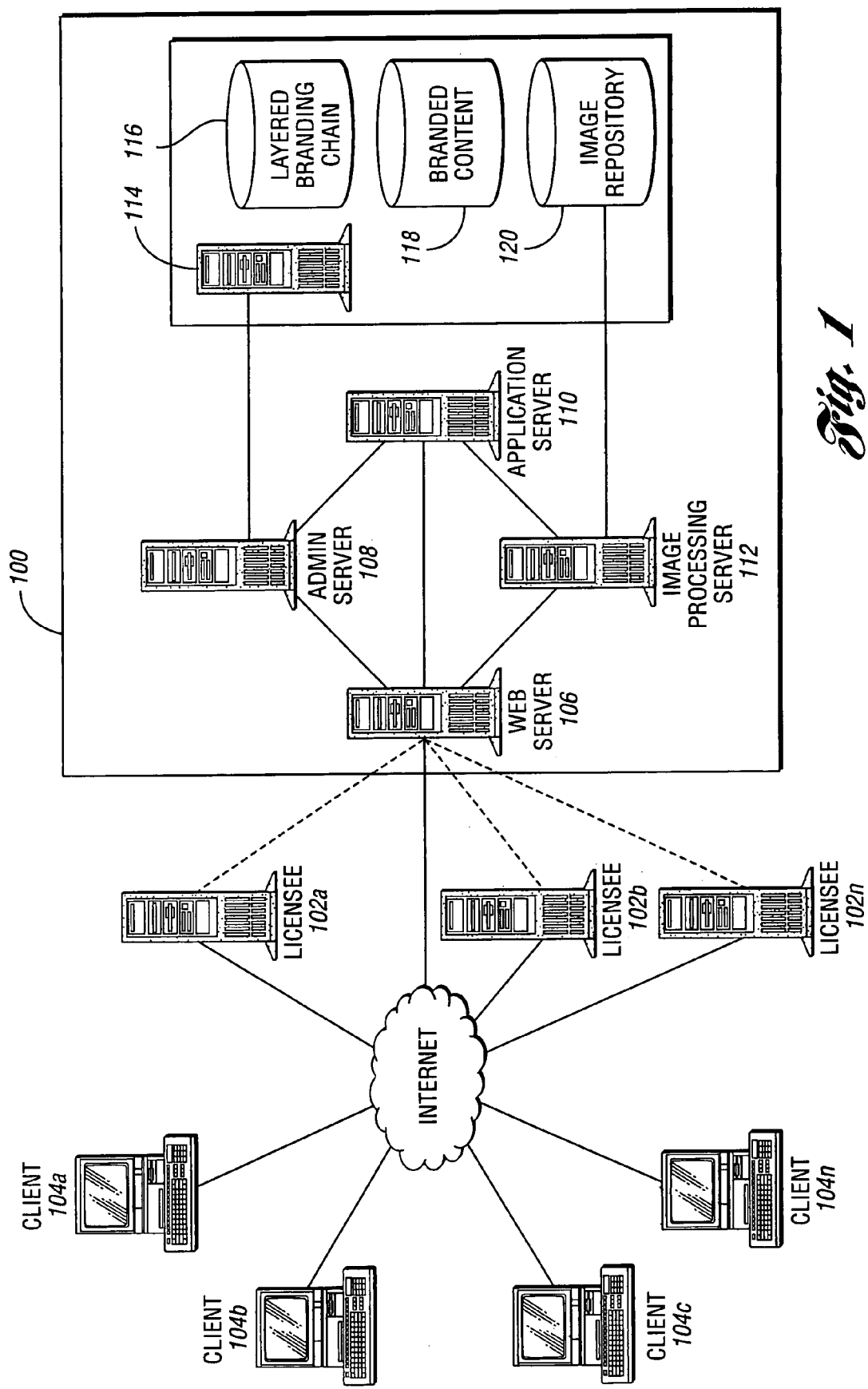
FIG. 1 illustrates a preferred system architecture for implementing the present invention within the surface material industry.

FIG. 1 illustrates a preferred system architecture for implementing the present invention within the fabric and finish industry. Those of ordinary skill in the art will recognize that aspects FIG. 1 may be changed, rearranged or otherwise adapted to best-fit a particular system implementation of the present invention—inside or outside of the fabric and finish industry.

Block 100 encompasses an aspect of the present invention for processing and serving custom-labeled fabric and finish content (e.g., fabric and finish samples, etc.) to a plurality of distributed servers 102a-102n and/or client computers 104a-104n. As described in greater detail below, processing and serving data may additionally take place at distributed servers 102a-102n.

Communication with components of block 100 may be established in a variety of manners including a computer network (LAN, WAN, etc.), dial-up or other direct link, wireless link, etc. Preferably, communication with components of block 100 is via TCP/IP over the Internet.

Users of the custom text, branding and/or and pictorial representations of custom-labeled fabric and finish content include, but are not limited to, operators of client computers 104a-104n and/or administrators of servers 102a-102n. In a preferred arrangement, business entities administrating servers 102a-102n (e.g., textile manufacturers, furniture manufacturers, re-manufacturers, distributors, retailers etc.) enter into a contractual agreement for the right to use or access custom branding, text and/or pictorial representations of custom-labeled fabrics and finishes, in an electronic format, from block 100. In one embodiment, the contractual agreement will be in the form a license agreement wherein the licensor administers block 100 and the licensee business entity administers servers 102a-102n. Via client computers 104a-104n, customers of the licensee business entities may access fabric and finish samples offered for sale by the licensee business entities.

In one implementation of the present invention, block 100 supports the creation, maintenance and sharing of multiple electronic catalogs for licensee business entities. These catalogs may contain the custom branding, text and/or pictorial representations of custom-labeled fabrics and finishes in an electronic format.

The catalog feature may be configured to associate specific fabric and finish samples with specific licensee products. For example, a furniture manufacturer may sell an upholstered chair. Only 40 of the 5,000 total fabrics offered by the furniture manufacturer may be suitable for use on the particular model of upholstered chair. The catalog feature may be configured to associate only the 40 suitable fabrics with the particular model of upholstered chair.

In a preferred implementation of the present invention, operators of client computers 104a-104n (consumers, customers, end users, etc.) access content (catalogs, etc.) from block 100 via hyperlinks links on licensee Internet sites. Alternately, a client operator may access content from block 100 directly—without first browsing a licensee Internet site. The direct arrangement may occur, for example, where an advertisement, e-mail, business card, etc. communicates a URL to a client computer operator. Preferably, interaction between a client and licensee server and/or block 100 is via a standard Internet browser utilizing TCP/IP, HTTP, HTTPS, etc.

Licensee internet sites may be hosted on servers 102a-102n. These sites may contain hyperlinks to block 100 (represented in FIG. 1 by dotted lines). In one implementation, a licensee's entire product catalog is served electronically by block 100. In another implementation, a licensee maintains and serves its own electronic catalog containing hyperlinks to particular custom-labeled content served at block 100.

Internet server 106 is a gateway for client data requests from block 100. In one implementation, Internet server 106 dispatches these requests to appropriate application servers. In the fabric and finish example, application servers may include an administrative server 108, an application server 110, an image processing server 112, and a database server 114. In further accordance with the fabric and finish example, database server 114 may be in operable communication with databases including a layered branding chain database 116, a branded content database 118 and an image repository 120.

In a preferred implementation of the present invention, surface material samples are processed and custom-labeled at application server 110. In one embodiment, such processing may take place in response to a client data request.

In addition, application server 110 may be configured to support layered responses to client requests for surface material samples and related related label information. In one embodiment of the present invention, layering responses includes the steps of adding, substituting and/or re-branding specification and related product data for successive tiers or points within a supply chain.

Data requests made by a client machine to the webserver 106 may contain business entity identifier, such as a licensee identifier. Entity identifiers may be implemented in a variety of manners include being coded into hyperlinks clicked from a client machine, read from a cookie on a client machine, or obtained through other methods depending on the needs of a particular implementation of the system.

In one embodiment, entity identifiers may be encoded within each data request to the web server 106. The web server passes these identifiers to the application server 110 which uses them to reference information such as the identity, profile, and layered response construction business rules from the layered branding chain database 116.

In addition, codes may provide additional information and/or association/indication as to the identity of a licensee, a specific licensee product or group of products to display, product marketing group, product or group information, etc. These codes may be implemented in a variety of manners. In one embodiment, these codes may be embedded within hyperlinks that are clicked from a client machine, read from a cookie on a client machine, or obtained through other methods depending on the needs of a particular implementation of the system.

For example, assume that a group of manufacturers, distributors and retailers are all licensees in operable communication with block 100. Assume that a manufacturer or "fabric mill" manufactures a particular type of furniture fabric. Three distributors supply this fabric to multiple retailers. Block 100 maintains knowledge of the supply chain relationships between the licensees and the custom-labeled surface material samples that are unique to each licensee. In one implementation, block 100 automatically identifies which tier or point within a supply chain that a particular request for content originates from.

Once the layer is identified, block 100 serves the appropriate content having the appropriate label information. For example, a surface material called "Red Fabric" by a manufacturer may be sold as "Sunrise" by a distributor, and resold as "Sunshine" by one retailer and "Sun Red" by another retailer.

In this example, block 100 delivers a product data set with a product name that is customized for content requests from particular points or tiers within that product's supply chain.

Figure 2:
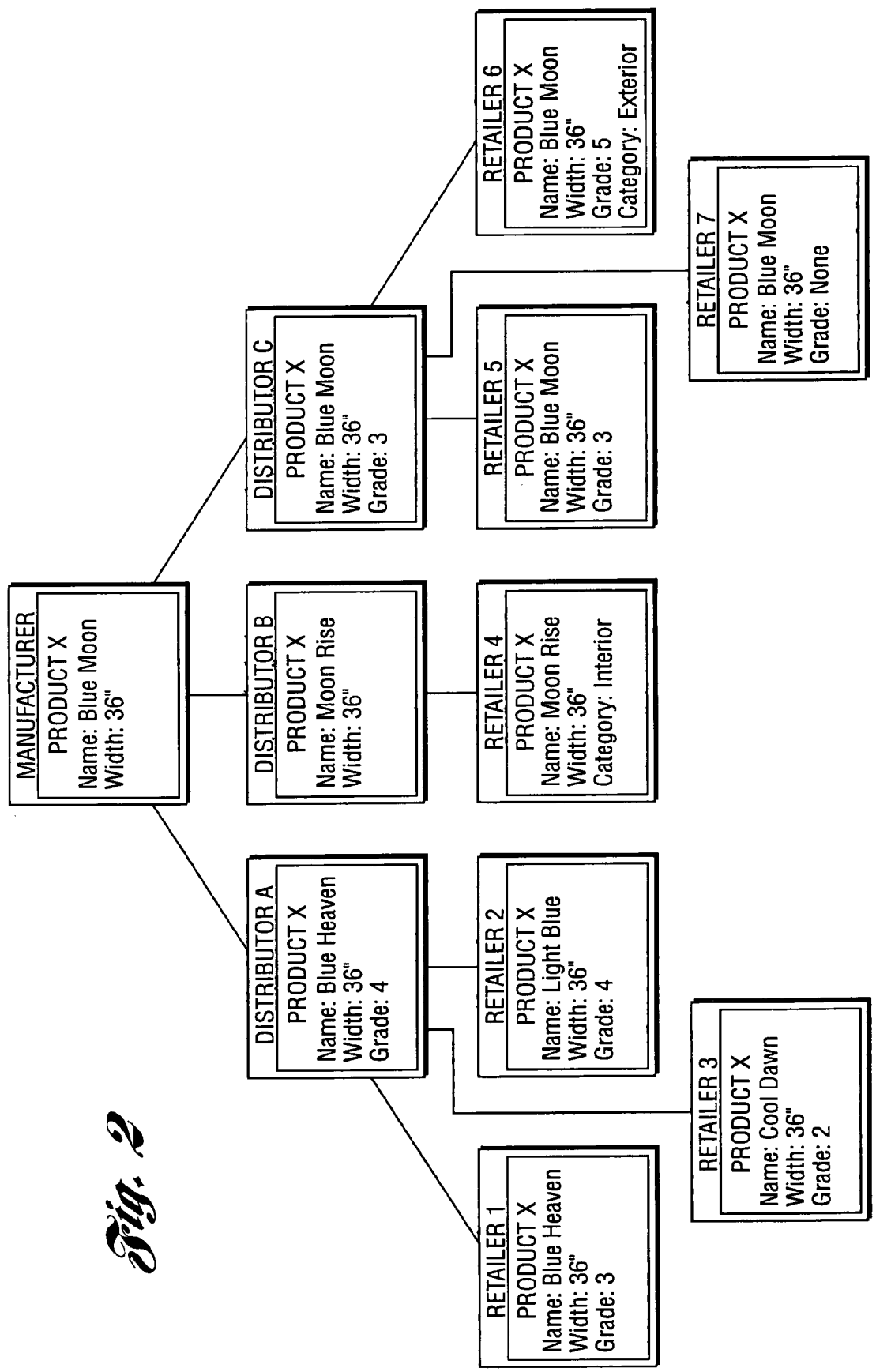
FIG. 2 illustrates an example of how custom content data may change at each stage of a hypothetical layered response construction.

FIG. 2 illustrates an example of how sample label information may change at each stage of a hypothetical layered response construction. Underlined text indicates data that has changed from a previous layer in the supply chain. In this example, a client request from Retailer 2 for data about Product X will see a product named "Light Blue." A client request from Distributor B for data about Product X will see a product named "Moon Rise." Text-based information that may be presented in association with content such as a surface finish sample includes, to the extent applicable: the name of the product, the color, the other available colors, the fiber content, the weave type, the weight, the width, the performance, cleaning code, light-fastness, breaking strength, pattern repeat, recommended applications, roll size, seam slippage, flammability, U/L approval, etc. Performance characteristics may include anti-stain finish, colorfastness, strength, resistance, abrasion and moisture regain.

Referring again to FIG. 1, image processing server 112 serves up content to Internet server 106 and/or application server 110. In the fabrics and finishes implementation of the present invention, for example, this content may include product and sample imagery. Imagery may be presented in a variety of file formats including but not limited to .tiff, .bmp. .jpg, .pdf, etc. Preferably, thumbnails of the images are provided to enhance initial content download time. Additional functionality may include a client ability to interactively zoom or otherwise magnify images.

Surface material samples may be delivered to or from aspects of block 100 via download, e-mail attachment, file transfer protocol (FTP), electronic data interchange (EDI), extensible mark-up language (XML), etc.

Preferably, surface material sample images are processed to show color, pattern and texture accurately for a variety of light color temperatures and environmental conditions. Products and samples may be displayed in a variety of different ambient lights (e.g., incandescent, fluorescent, tungsten, natural lighting, sunshine, etc.). Color correction such as Kodak Verifi Color may be implemented to enhance the presentation of visual content. High-resolution color PDF documents may also be provided so that client operators can print true-to-life product and sample imagery. In yet another embodiment, the samples may be mapped (color mapped, bump mapped, texture mapped, etc.) onto a two or three-dimensional representation of an object or product. For example, a customer browsing a furniture retailer's inventory may be provided with functionality for selecting different chair fabric samples to be mapped onto a three-dimensional representation of a chair offered for sale by the retailer.

Databases in operable communication with database server 114 maintain content, data and relationships to support functionality hosted at the Internet server 106, the image processing server 112 and administrative server 108 (described herein).

Administrative server 108 may be configured to provide administrative functionality for managing data and/or content.

Figure 3:
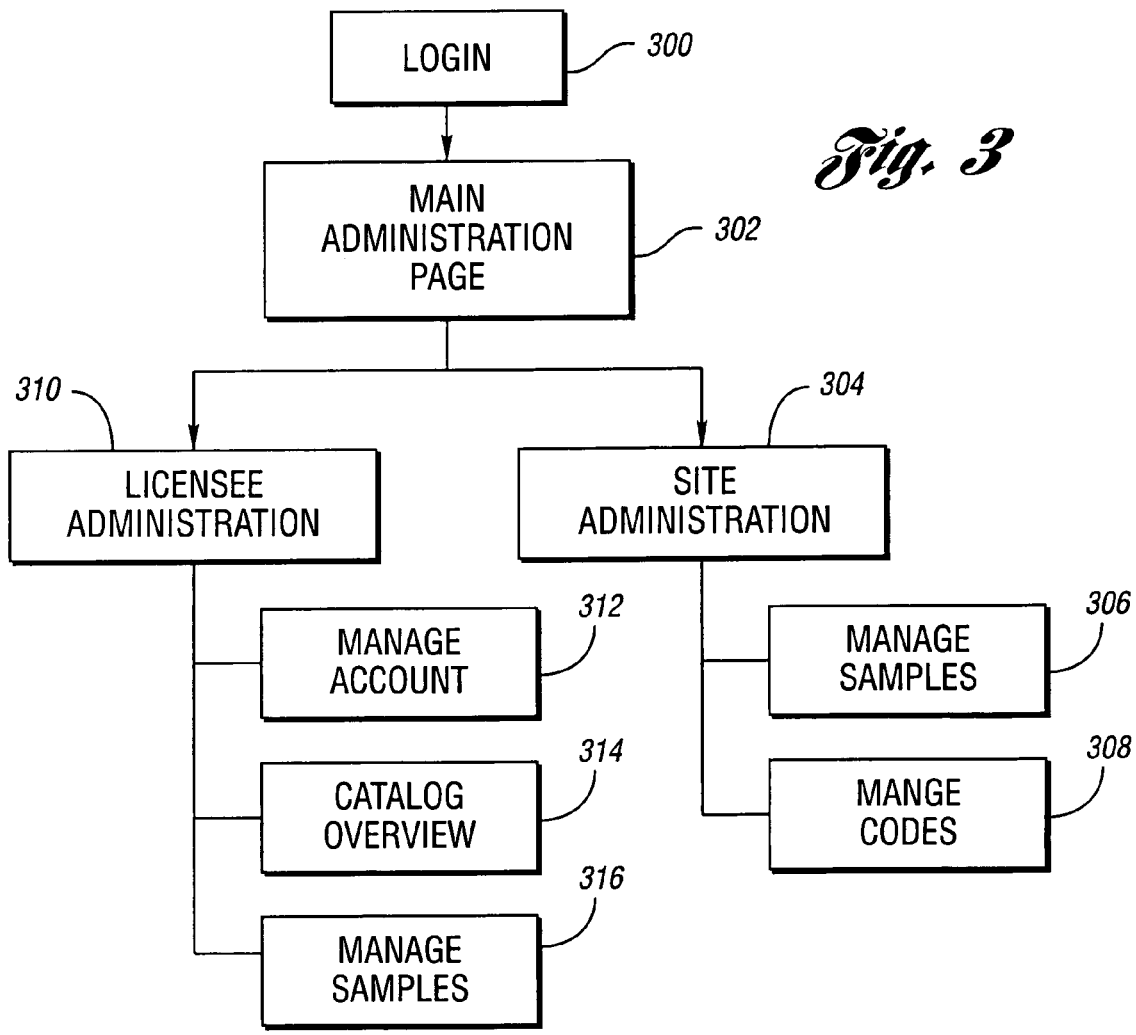
FIG. 3 is a block flow diagram illustrating example licensee and site administrator architecture and functionality supported in accordance with the example fabric and finish implementation of the present invention.

FIG. 3 is a block flow diagram illustrating example administration architecture and functionality supported in accordance with the example fabric and finish implementation of the present invention. In this example, authorized administrators and/or licensees access an administrative Internet site hosted on the Internet server (106 in FIG. 1) via a secure login, as represented in block 300. Upon login, authorized users are presented with a main administration page, as represented in block 302.

Upon selecting the site administrator hyperlink the user (if authorized) is presented with a site administration page, as represented in block 304. Here, the administrator selects from hyperlinks including "manage samples," "manage sample codes," etc. Upon selecting the "manage samples" hyperlink, the administrator is presented with a sample management page, as represented in block 306. The sample management page enables an administrator to identify default names for fabrics and finish samples, assign samples to licensee catalogs, edit the samples, add samples (including samples provided by licensees themselves), delete samples, etc. Modifying a sample includes defining an image for the sample, defining attributes for the sample (e.g., description, sample code, technical information, etc.), defining whether the sample is "active" within the system, etc.

Managing sample and relationship codes, as represented in block 308, includes functionality for associating attributes with surface material samples, associating surface material samples with business entities, associating surface material samples with label information, etc. For example, sample and relationship codes may be configured for a particular business entity to define what surface material samples or groups of surface material samples to display to the business entity's customers. Sample and relationship codes may also associate label information with surface material samples. In one embodiment of the present invention, the business entity itself may define some or all of the label/sample attribute data that pertains to that business entity's surface material samples.

Authorized administrators and/or authorized licensees accessing the administrative server 108 have access to a licensee administration page, as represented in block 310. Here, administrators and/or licensees have the option of viewing and configuring licensee account information as represented in block 312, viewing an online catalog configuration overview as represented in block 314, and managing samples included within an online catalog as represented in block 316.

Licensee account information may include the licensee's formal name, one or more e-mail address to which customer sample orders and other correspondence may be forwarded, contact information for the licensee and licensee service level.

| Level | Level Description | Automated Business Rules |
|---|---|---|
| 1 | Standard Showroom Features: Browse an up-to-date fabric and finish library by category | Fabrics and Patterns made active in the global catalog do not appear in any licencee's catalog until explicitly added |

-continued

| Level | Level Description | Automated Business Rules |
|---|---|---|
| | Search for specific item by category, color, or style<br>Search results display small thumbnail images for quick review<br>Click on a thumbnail image for a large detail image and specification information<br>Print or save any detailed sample image and specification in PDF format<br>Add fabrics and finishes to project file that can be e-mailed to anyone for further discussion, opinions, and approvals<br>Make finish selections and add them to sample order<br>Easily place online sample orders. Users may request samples be delivered to their own address or directly to a client<br>Private Label System Features:<br>Branded Fabric and Finish Sample Room, including branded project files and PDF information sheets<br>Include any or all fabrics from global catalog<br>Kodak Verifi Web Accurate Color System (www.verifi.net)<br>Sample order routing to Licensee or directly to a fulfillment center<br>Licensee-defined product grading<br>All fabrics and finishes can follow licensee-specific naming conventions | by an administrative action.<br>Every Fabric and Pattern made inactive in the global catalog is immediately and automatically made inactive in the licensee's catalog.<br>When global patterns and fabrics are added to a licensee's catalog, they default to the "active" state.<br>Sample orders are routed to the sample order address referenced from the licensee's profile. |
| 2 | Standard Showroom Features:<br>Browse an up-to-date fabric and finish library by category<br>Search for specific item by category, grade, color, or style<br>Search results display small thumbnail images for quick review<br>Click on a thumbnail image for a large detail image and specification information<br>Print or save any detailed sample image and specification in PDF format<br>Add fabrics and finishes to project file that can be e-mailed to anyone for further discussion, opinions, and approvals<br>Make finish selections and add them to sample order<br>Easily place online sample orders. Users may request samples be delivered to their own address or directly to a client<br>Private Label System Features:<br>Branded Fabric and Finish Sample Room, including branded project files and PDF information sheets<br>Include any finish material from any source<br>Kodak Verifi Web Accurate Color System (www.verifi.net)<br>Sample order routing to Licensee or directly to a fulfillment center<br>Licensee-defined product grading<br>All fabrics and finishes can follow licensee-specific naming conventions | Fabrics and Patterns made active in the global catalog do not appear in any licensee's catalog until explicitly added by an administrative action.<br>Every Fabric and Pattern made inactive in the global catalog is immediately and automatically made inactive in the licensee's catalog.<br>When global patterns and fabrics are added to a licensee's catalog, they default to the "active" state.<br>Sample orders are routed to the sample order address referenced from the licensee's profile. |
| 3 | Standard Showroom Features:<br>Click fabric or finishes link from a product entry in furniture catalog to browse and search only the finishes approved for use with the specific furniture product<br>Search within approved finish set by grade, color, or style<br>Search results display small thumbnail images for quick review<br>Click on thumbnail image for large | Fabrics and Patterns made active in the global catalog do not appear in any licensee's catalog until explicitly added by an administrative action<br>Every Fabric and Pattern made inactive in the global catalog is immediately and automatically made inactive in the licensee's catalog.<br>When global patterns and fabrics are added to a licensee's catalog, they default to the "active" state. |

-continued

| Level | Level Description | Automated Business Rules |
|---|---|---|
| | detail image and specification information<br>Print or save any detailed sample image and specification in PDF format<br>Add fabrics and finishes along with name of furniture product with which they are associated to a project file that can be e-mailed to anyone for further discussion, opinions, and approvals<br>Make finish selections and add them to a sample order<br>Easily place online sample orders.<br>Users may request samples be delivered to their own address or directly to a client<br>Private Label System Features:<br>Branded Fabric and Finish Sample Room, including branded project files and PDF information sheets<br>Include any finish material from any source<br>Kodak Verifi Web Accurate Color System (www.verifi.net)<br>Sample order routing to Licensee or directly to a fulfillment center<br>Licensee-defined product grading<br>All fabrics and finishes can follow licensee-specific naming conventions | Materials imaged for a licensee are associated with the material datarecord by identifier at upload.<br>Licensee materials entered into the global catalog do not appear in the licensee's catalog until they are explicitly added.<br>Sample orders are routed to the sample order address referenced from the licensee's profile. |
| 4 | Standard Furniture Catalog Features:<br>Basic furniture catalog in its own window.<br>In many cases furniture is configurable. For instance, an office chair may be available with either loop or t-style arms. Each unique configuration will be treated as a separate product.<br>Each furniture product has a single image, up to four specification attributes, and a memo field to hold a marketing description of the product.<br>Search furniture using up to three attributes.<br>Furniture search results display small thumbnail furniture images for quick review<br>Click on furniture thumbnail image for larger detail image and specification information<br>Print or save any detailed furniture image and specification in PDF format<br>Add furniture to a project file that can be e-mailed to anyone for further discussion, opinions, and approvals | Fabrics and Patterns made active in the global catalog do not appear in any licensee's catalog until explicitly added by an administrative action.<br>Every Fabric and Pattern made inactive in the global catalog is immediately and automatically made inactive in the licensee's catalog.<br>When global patterns and fabrics are added to a licensee's catalog, they default to the "active" state.<br>Materials imaged for a licensee are associated with the material datarecord by identifier at upload.<br>Licensee materials entered into the global catalog do not appear in the licensee's catalog until they are explicitly added.<br>Sample orders are routed to the sample order address referenced from the licensee's profile. |
| 4 cont'd | Standard Fabric and Finish Showroom Features:<br>Click fabric or finishes link from a product entry in furniture catalog to browse and search only the finishes approved for use with the specific furniture product<br>Search within approved finish set by grade, color, or style<br>Search results display small thumbnail images for quick review<br>Click on thumbnail image for large detail image and specification information<br>Print or save any detailed sample image and specification in PDF format<br>Add fabrics and finishes along with name of furniture product with which they are associated to a project file that can be e-mailed to anyone for further discussion, opinions, and approvals<br>Make finish selections and add them to a sample order | |

| Level | Level Description | Automated Business Rules |
|---|---|---|
| | Easily place online sample orders. Users may request samples be delivered to their own address or directly to a client Private Label System Features: Branded Fabric and Finish Sample Room, including branded project files and PDF information sheets Include any finish material from any source Kodak Verifi Web Accurate Color System (www.verifi.net) Sample order routing to Licensee or directly to a fulfillment center Licensee-defined product grading All fabrics and finishes can follow licensee-specific naming conventions | |

The catalog overview function may include sample listings such as: all available samples within the global database, all samples from the global database that a licensee has included in its online catalog (by default name and/or licensee rename), and all licensee-specific samples within the licensee online catalog.

Administrative functionality for managing samples includes defining custom names, descriptions, pricing, etc. for the samples, editing the samples, adding new samples to the catalog, (including samples provided by licensees themselves), deleting samples, etc.

Figure 4:
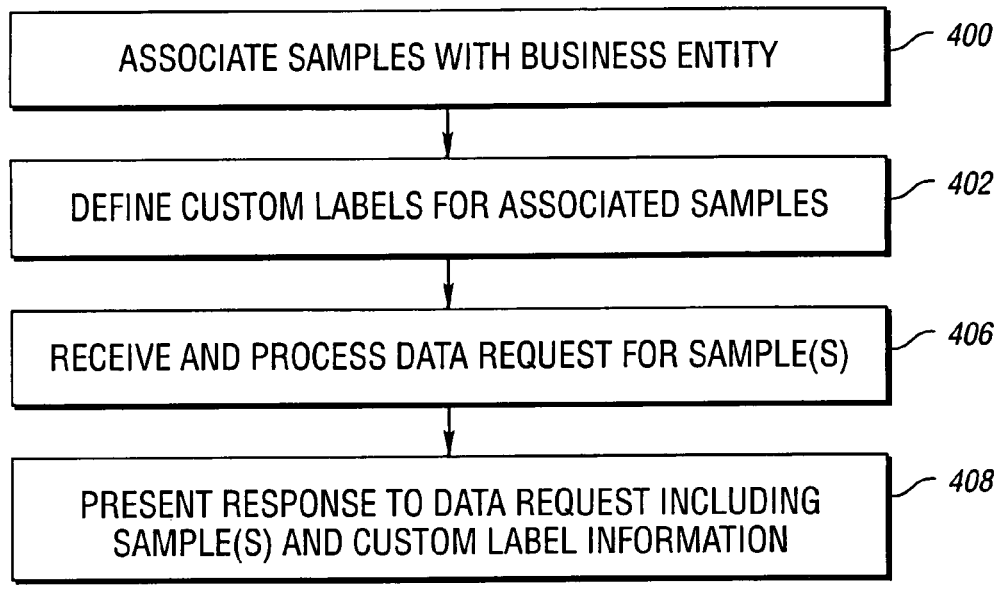
FIG. 4 is a block flow diagram illustrating a preferred methodology for implementing the present invention.

FIG. 4 is a block flow diagram illustrating a preferred methodology for implementing the present invention. In a computer server arrangement including at least one computer database, one or more surface material samples are selected and associated with a business entity as represented in block 400. This selection step may be governed by a service level configuration and/or one or more automated business rules, as discussed in greater detail above. As represented in block 402, custom label information is specified for at least one of the surface material samples. The custom label information may be default label information for the surface material sample(s), or be uniquely customized by the business entity as discussed above.

As represented in block 406, a request for a surface material sample is received and processed at the computer server arrangement. The request includes an identifier to specify the business identity with whom the request for data is associated. As discussed in greater detail above, the request for data may include additional information such as supply chain layer information, product information, etc.

As represented in block 408, an appropriate response is made to the data request. Typically, the response includes a graphical representation of the requested surface material sample and the custom label information associated with the sample—as may be specified by the business entity. Depending on the configuration of the data request and the business entity's service level configuration, responses to the data request may vary, as described in greater detail above. For example, responses to the data request may vary depending on the supply chain layer that the data request originated from.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method implemented on one or more computer servers for generating a customized web page for a furniture item having a plurality of surface material options, the method comprising:
   receiving data representing a plurality of images of surface materials which may be applied to at least one furniture item;
   receiving data representing label information corresponding to at least one of the plurality of images and the at least one furniture item, the label information including branding corresponding to two or more business entities in one or more layers of a furniture supply chain;
   receiving a TCP/IP request identifying one of the business entities;
   generating a web page including at least a subset of the plurality of images of surface materials which may be applied to one or more furniture items of the identified business entity together with the branding corresponding to the identified business entity;
   receiving input identifying one of the subset of the plurality of images of surface materials to be applied to one of the furniture items;
   mapping the identified surface material image onto an image depicting the furniture item;
   generating a web page which includes an image of the furniture item having the selected surface material image mapped thereon, and the label information associated with the selected surface material including the branding corresponding to the identified business entity and
   outputting the generated web page from the one or more servers, wherein the web page is capable of being displayed on a remotely located user device.

2. The method of claim 1 wherein one or more of the inputs are received over the Internet.

3. The method of claim 1 is additionally comprising generating a portable document format (PDF) file including the image of the furniture item having the identified surface material image mapped thereon.

4. The method of claim 1 wherein the mapping comprises color mapping.

5. The method of claim 1 wherein the mapping comprises bump mapping.

6. The method of claim 1 wherein the mapping comprises texture mapping.

7. The method of claim 1 wherein one or more of the images of surface materials are presented in a variety of light color temperatures or environmental conditions.

8. The method of claim 1 further comprising retrieving the image of the surface material mapped onto the image depicting the furniture item from a computer database.

9. The method of claim 1 wherein the surface material comprises a surface finish.

10. The method of claim 1 wherein the label information includes pricing information.

11. The method of claim 1 additionally comprising receiving input identifying a furniture item or a catalog of furniture items.

12. A computer system for generating a customized web page for a furniture item having a plurality of surface material options, the system comprising one or more computers programmed and configured to:
   receive data representing a plurality of images of surface materials which may be applied to at least one furniture item and store the images into one or more computer databases;
   receive data representing label information corresponding to each of the plurality of images and the at least one furniture item, and store the label information in the one or more computer databases, wherein the label information includes branding corresponding to two or more business entities in one or more layers of a furniture supply chain;
   receiving a TCP/IP request identifying one of the business entities;
   generate a web page including at least a subset of the plurality of images of surface materials which may be applied to one or more furniture items of the identified business entity together with the branding corresponding to the identified business entity;
   receive input identifying one of the subset of the plurality of images of surface material to be applied to one of the furniture items;
   map the identified surface material image onto an image depicting the furniture item;
   generate a web page which includes an image of the furniture item having the selected surface material image mapped thereon and the label information associated with the selected surface material including the branding corresponding to the identified business entity; and
   output the generated web page which is capable of being displayed on a remotely located user device.

13. The system of claim 12 wherein one or more of the inputs or outputs are communicated over the Internet.

14. The system of claim 12 wherein the one or more computers are programmed and configured to generate a portable document format (PDF) file including the image of the furniture item having the identified surface material image mapped thereon.

15. The system of claim 12 wherein the mapping comprises color mapping.

16. The system of claim 12 wherein the mapping comprises bump mapping.

17. The system of claim 12 wherein the mapping comprises texture mapping.

18. The system of claim 12 wherein one or more of the images of surface materials are presented in a variety of light color temperatures or environmental conditions.

19. The system of claim 12 additionally comprising a computer database for storing the image of the surface material mapped onto the image depicting the furniture item.

20. The system of claim 12 wherein the surface material comprises a surface finish.

\* \* \* \* \*

UNITED STATES PATENT AND TRADEMARK OFFICE
CERTIFICATE OF CORRECTION

| | | |
|---|---|---|
| PATENT NO. | : 8,086,466 B2 | Page 1 of 1 |
| APPLICATION NO. | : 11/801477 | |
| DATED | : December 27, 2011 | |
| INVENTOR(S) | : Keith Stinson et al. | |

It is certified that error appears in the above-identified patent and that said Letters Patent is hereby corrected as shown below:

Column 12, Line 58, Claim 3:

After "The method of claim 1" delete "is".

Signed and Sealed this
Twentieth Day of March, 2012

David J. Kappos
*Director of the United States Patent and Trademark Office*